US012671680B2

(12) United States Patent
Miele et al.

(10) Patent No.: US 12,671,680 B2
(45) Date of Patent: Jun. 30, 2026

(54) SYSTEMS AND METHODS FOR ACCOUNT SESSION MANAGEMENT

(71) Applicant: The Toronto-Dominion Bank, Toronto (CA)

(72) Inventors: Lauren Erica Miele, Toronto (CA); Adam Judson, Toronto (CA); James Wolanski, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 298 days.

(21) Appl. No.: 17/738,564

(22) Filed: May 6, 2022

(65) Prior Publication Data

US 2023/0362151 A1 Nov. 9, 2023

(51) Int. Cl.
*H04L 9/40* (2022.01)
*G06Q 20/38* (2012.01)
*G06Q 20/40* (2012.01)

(52) U.S. Cl.
CPC ..... *H04L 63/0815* (2013.01); *G06Q 20/3821* (2013.01); *G06Q 20/4014* (2013.01); *H04L 63/0807* (2013.01)

(58) Field of Classification Search
None
See application file for complete search history.

(56) References Cited

U.S. PATENT DOCUMENTS

| | | | | |
|---|---|---|---|---|
| 6,629,246 B1 | 9/2003 | Gadi | | |
| 10,102,582 B2 * | 10/2018 | Johansen | ............... | G06Q 50/01 |
| 10,990,965 B2 * | 4/2021 | Leyva | ................ | G06Q 20/4014 |

(Continued)

FOREIGN PATENT DOCUMENTS

| | | |
|---|---|---|
| CA | 3077870 | 10/2021 |
| CA | 3081248 | 11/2021 |
| WO | 2013188706 | 12/2013 |

OTHER PUBLICATIONS

Unifimoney Inc.., Unifimoney—Save Invest Earn the Money Superapp; Published in Apple App Store; https://apps.apple.com/us/app/unifimoney/id1515674781; retrieved Feb. 10, 2022.

*Primary Examiner* — Rupal Dharia
*Assistant Examiner* — Shadi H Kobrosli
(74) *Attorney, Agent, or Firm* — Rowand LLP

(57) ABSTRACT

A computer-implemented method includes: receiving, via a computing device, a login request for a resource account; authenticating a user associated with the login request to an account session of the resource account; receiving, via the computing device during the account session, a trade request for performing a first trading action in connection with a tradeable object; in response to receiving the trade request: granting time-limited access to an account operation for the resource account, the first account operation associated with defined first trade parameters for the first trading action; receiving user input for initiating the first account operation at a first time; validating the first account operation based on verifying eligibility of the first trading action and validity of the account session at the first time; and in response to validating the first account operation, cause the first trading action to be executed based on processing the first account operation.

18 Claims, 7 Drawing Sheets

(56)          References Cited

U.S. PATENT DOCUMENTS

| | | | |
|---|---|---|---|
| 2005/0097029 A1* | 5/2005 | Cooper | G06Q 40/04 |
| | | | 705/37 |
| 2005/0108142 A1* | 5/2005 | Beadle | H04L 63/10 |
| | | | 705/37 |
| 2005/0234807 A1* | 10/2005 | Toffey | G06Q 40/12 |
| | | | 705/37 |
| 2007/0174193 A1* | 7/2007 | Quan | G06Q 40/02 |
| | | | 705/44 |
| 2010/0287114 A1* | 11/2010 | Bartko | G06Q 40/06 |
| | | | 705/37 |
| 2012/0265664 A1* | 10/2012 | Triplett | G06Q 40/04 |
| | | | 705/37 |
| 2013/0097047 A1 | 4/2013 | Kim | |
| 2014/0129404 A1* | 5/2014 | White | G06Q 40/06 |
| | | | 705/37 |
| 2015/0012402 A1* | 1/2015 | Buck | G06Q 40/04 |
| | | | 705/37 |
| 2015/0356679 A1* | 12/2015 | Schmitt | G06Q 40/04 |
| | | | 705/37 |
| 2015/0379641 A1* | 12/2015 | Kerpel | G06Q 40/06 |
| | | | 705/36 R |
| 2016/0151715 A1* | 6/2016 | Polansky | A63F 13/792 |
| | | | 463/25 |
| 2016/0180458 A1* | 6/2016 | Singer | G06Q 40/04 |
| | | | 705/37 |
| 2018/0211314 A1* | 7/2018 | Renalds | G06Q 40/04 |
| 2018/0232806 A1* | 8/2018 | Teng | G06N 7/02 |
| 2019/0379768 A1* | 12/2019 | Amicangioli | H04L 63/0414 |
| 2021/0044976 A1* | 2/2021 | Avetisov | G06F 21/64 |
| 2021/0314311 A1 | 10/2021 | Metwalli et al. | |
| 2021/0366044 A1 | 11/2021 | Baldwin et al. | |
| 2022/0406145 A1* | 12/2022 | Crosthwaite | G07F 17/3288 |

* cited by examiner

105

Processor 200

Memory
210

250

Input Interface
Module
220

Output Interface
Module
230

Communications
Module
240

210

Application Software 270

Web Browser 272

Operating System
280

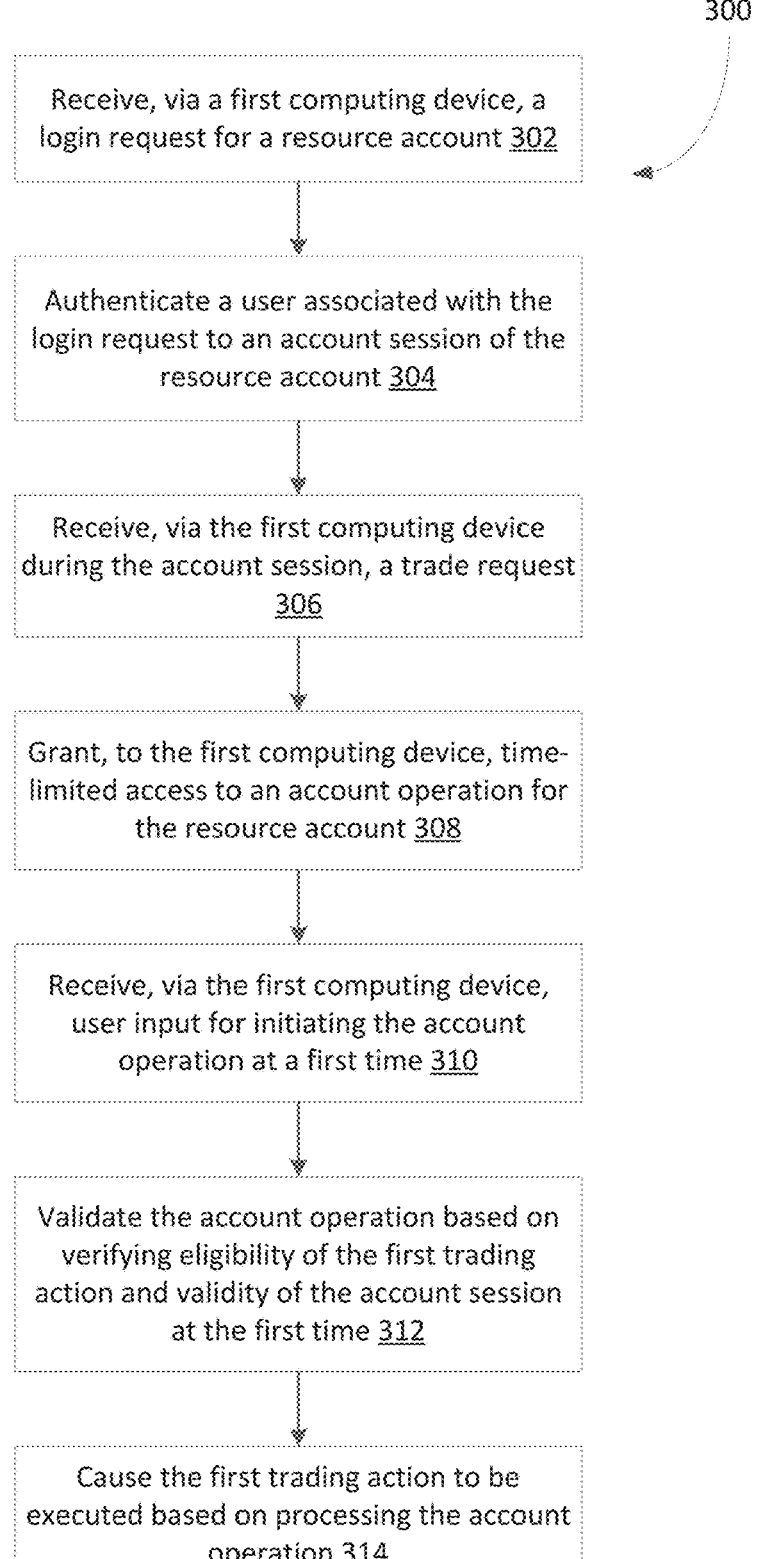

300

Receive, via a first computing device, a login request for a resource account 302

Authenticate a user associated with the login request to an account session of the resource account 304

Receive, via the first computing device during the account session, a trade request 306

Grant, to the first computing device, time-limited access to an account operation for the resource account 308

Receive, via the first computing device, user input for initiating the account operation at a first time 310

Validate the account operation based on verifying eligibility of the first trading action and validity of the account session at the first time 312

Cause the first trading action to be executed based on processing the account operation 314

FIG. 3

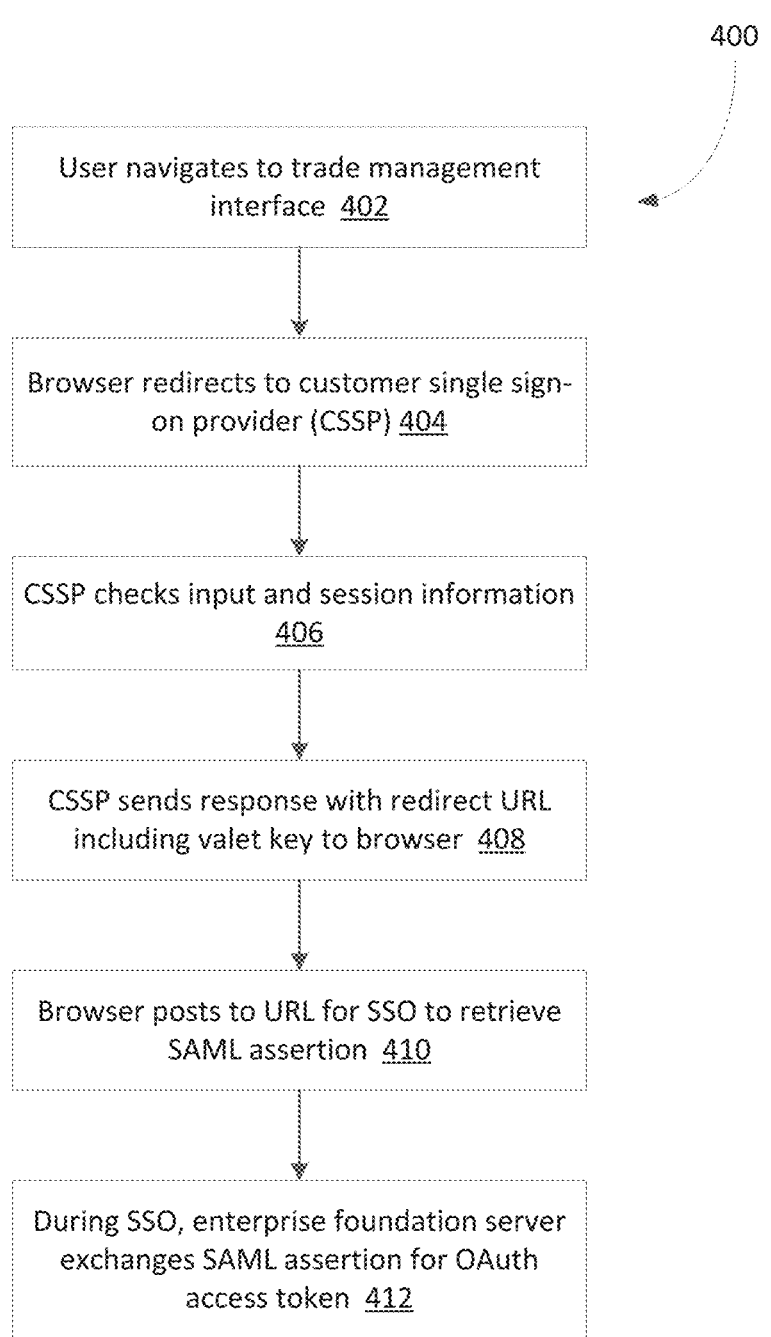

400

User navigates to trade management interface 402

Browser redirects to customer single sign-on provider (CSSP) 404

CSSP checks input and session information 406

CSSP sends response with redirect URL including valet key to browser 408

Browser posts to URL for SSO to retrieve SAML assertion 410

During SSO, enterprise foundation server exchanges SAML assertion for OAuth access token 412

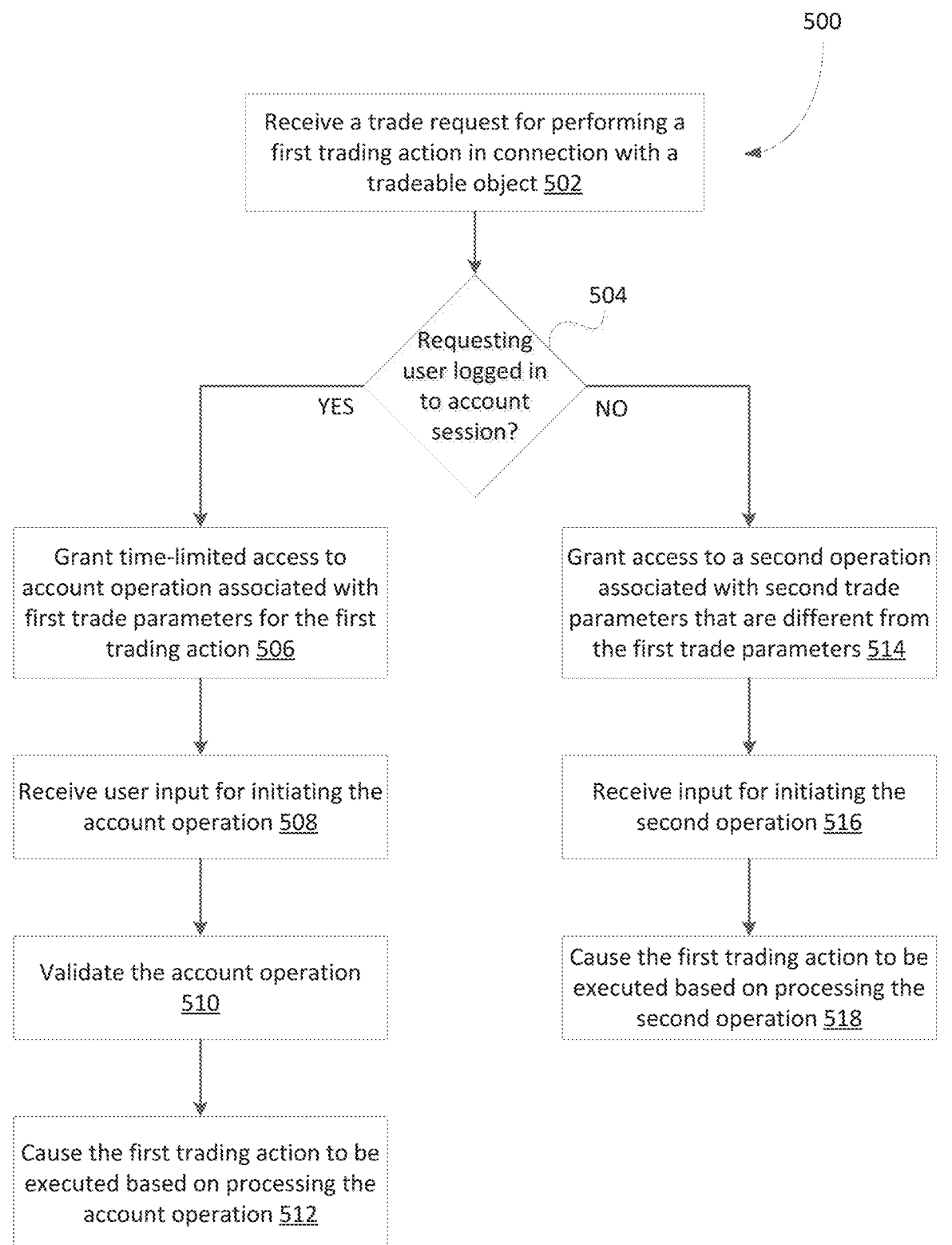

Receive a trade request for performing a first trading action in connection with a tradeable object 502

504

Requesting user logged in to account session?

YES

NO

Grant time-limited access to account operation associated with first trade parameters for the first trading action 506

Grant access to a second operation associated with second trade parameters that are different from the first trade parameters 514

Receive user input for initiating the account operation 508

Receive input for initiating the second operation 516

Validate the account operation 510

Cause the first trading action to be executed based on processing the second operation 518

Cause the first trading action to be executed based on processing the account operation 512

FIG. 5

SYSTEMS AND METHODS FOR ACCOUNT SESSION MANAGEMENT

FIELD

The present application relates to data security and, more particularly, to systems and methods for managing account sessions of authenticated users for a resource account.

BACKGROUND

Trading platforms enable users to perform various trade-related actions. Trading platforms are typically operated independently of other systems that manage user account data. For example, a trading platform may be provided by a server that implements its own procedures for account management, such as user authentication, data encryption and storage, access controls, etc., thereby limiting its capacity for integration with other related computing systems.

BRIEF DESCRIPTION OF THE DRAWINGS

Reference will now be made, by way of example, to the accompanying drawings which show example embodiments of the present application and in which:

FIG. 3 shows, in flowchart form, an example method for controlling access to trading actions in an authenticated account session of a resource account;

FIG. 4 shows, in flowchart form, an example method for authenticating a user to an account session of a resource account;

FIG. 5 shows, in flowchart form, an example method for processing requests to perform trading actions in connection with a tradeable object;

Like reference numerals are used in the drawings to denote like elements and features.

DETAILED DESCRIPTION OF EXAMPLE EMBODIMENTS

Figure 1:
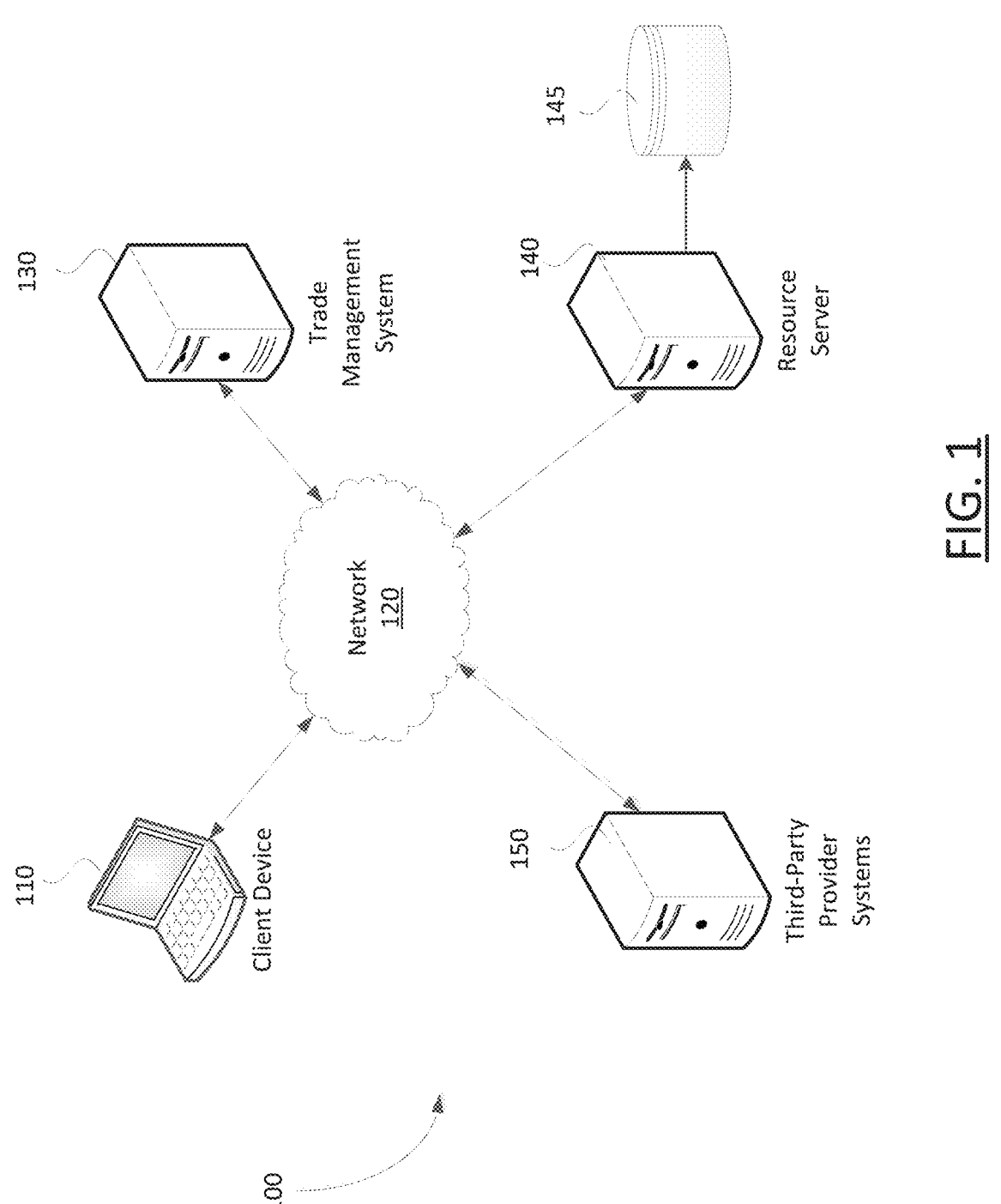
FIG. 1 is a schematic operation diagram illustrating an operating environment of an example embodiment.

In an aspect, a computing system is disclosed. The computing system includes a processor and a memory coupled to the processor. The memory stores instructions that, when executed by the processor, configure the processor to: receive, via a first computing device, a login request for a resource account; authenticate a user associated with the login request to an account session of the resource account; receive, via the first computing device during the account session, a trade request for performing a first trading action in connection with a tradeable object; in response to receiving the trade request: grant, to the first computing device, time-limited access to a first account operation for the resource account, the first account operation associated with defined first trade parameters for the first trading action; receive, via the first computing device, user input for initiating the first account operation at a first time; validate the first account operation based on verifying eligibility of the first trading action and validity of the account session at the first time; and in response to validating the first account operation, cause the first trading action to be executed based on processing the first account operation.

In some implementations, the instructions, when executed, may further configure the processor to: receive, via a second computing device, a second trade request for performing a second trading action in connection with the tradeable object; determine that the second trade request does not originate from a computing device associated with the account session; in response to the determining, grant, to the second computing device, access to a second operation associated with second trade parameters that are different from the first trade parameters.

In some implementations, the first trade parameters may include a resource cost associated with obtaining the tradeable object and the first account operation may include a transfer of resources associated with the resource account.

In some implementations, verifying the validity of the account session may include verifying that an access token associated with the account session is valid at the first time.

In some implementations, granting the time-limited access to the first account operation for the resource account may include providing, via the first computing device, a user interface for accessing an interface element for initiating the first account operation during a defined first time period.

In some implementations, the first time period may be dependent on an object type associated with the tradeable object.

In some implementations, the instructions, when executed, may further configure the processor to: determine that the user input for initiating the first account operation is not received within a defined period of validity of the first account operation; in response to determining that the user input is not received within the period of validity: retrieve, from a remote computing server, current object data associated with the tradeable object; generate display data in connection with a time-limited second account operation based on the current object data; and provide, to the first computing device for display thereon, the generated display data.

In some implementations, the instructions, when executed, may further configure the processor to provide a user interface for inputting the trade request, and providing the user interface may include providing an indication that the first account operation is associated with the account session.

In some implementations, the resource account may be a bank account and the user may be authenticated to the account session based on login credentials associated with the bank account.

In some implementations, the instructions, when executed, may further configure the processor to: generate a single sign-on (SSO) token responsive to authenticating the user to the account session; and transmit the SSO token to the first computing device, and the first account operation may be processed using the SSO token.

In another aspect, a computer-implemented method is disclosed. The method includes: receiving, via a first computing device, a login request for a resource account; authenticating a user associated with the login request to an account session of the resource account; receiving, via the first computing device during the account session, a trade request for performing a first trading action in connection with a tradeable object; in response to receiving the trade request:

3 granting, to the first computing device, time-limited access to a first account operation for the resource account, the first account operation associated with defined first trade parameters for the first trading action; receiving, via the first computing device, user input for initiating the first account operation at a first time; validating the first account operation based on verifying eligibility of the first trading action and validity of the account session at the first time; and in response to validating the first account operation, cause the first trading action to be executed based on processing the first account operation.

In another aspect, a non-transitory computer readable storage medium is disclosed. The computer readable storage medium contains instructions thereon that, when executed by a processor, configure the processor to: receive, via a first computing device, a login request for a resource account; authenticate a user associated with the login request to an account session of the resource account; receive, via the first computing device during the account session, a trade request for performing a first trading action in connection with a tradeable object; in response to receiving the trade request: grant, to the first computing device, time-limited access to a first account operation for the resource account, the first account operation associated with defined first trade parameters for the first trading action; receive, via the first computing device, user input for initiating the first account operation at a first time; validate the first account operation based on verifying eligibility of the first trading action and validity of the account session at the first time; and in response to validating the first account operation, cause the first trading action to be executed based on processing the first account operation.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "tradeable object" refers to any object which may be traded. A certain quantity of a tradeable object may be bought or sold for a particular price. A tradeable object may include, without limitation, stocks, options, bonds, future contracts, currency, warrants, derivatives, securities, commodities, swaps, interest rate products, index-based products, goods, or a combination thereof. More generally, a tradeable object may include a product listed and/or administered by an exchange or marketplace, a product defined by an entity, a combination of real and synthetic products, or a combination thereof.

User account data may be stored and managed across numerous different platforms. Each such platform may be hosted by a computing system that implements its own procedures for account management, such as user authentication, data encryption and storage, access controls, and the like. In certain contexts, it is desirable to enable cross-platform coordination such that systems can access user account data associated with other related systems in an easy and seamless manner. Single sign-on (SSO) is an authentication mechanism that allows a user to log in with a single authentication credential to any of multiple related, yet independent, computing systems. SSO enables users to log in once to a computing system and access services of related systems without re-entering authentication credentials.

An example of a computing system for managing user account data is a trading platform. Users can perform various trading actions (e.g., purchasing or selling commodities, such as precious metals) on a trading platform in connection with a specific account. A trading platform may be configured to maintain trade-related data, such as historical trading activity data and portfolio holdings data, for users of the platform. Additionally, a trading platform may provide recommendations of trade orders, customized offers, etc. to its users based on the users' account information. In that regard, a trading platform may benefit from access to account data across related platforms or systems, such as a resource account management system (e.g., a financial institution server).

Trading platforms are typically operated independently of other systems that manage user account data. For example, a trading platform may implement a user authentication scheme that is independent of authentication for other related computing systems. As a result, users may need to separately authenticate to the trading platform and related account management systems, which has the effect of increasing user burden. Furthermore, with little to no integration, each of a trading platform and a related, yet independent, account management system may be limited in providing users with access to data (e.g., user information) and functionalities of the other system.

The present application describes solutions for addressing some of the aforementioned technical limitations associated with conventional trading platforms and user account management systems. A computing system and methods for integrating an independent resource account with a trading platform are disclosed. The computing system is configured to receive a login request for a resource account and authenticate a user associated with the login request to an authenticated account session for the resource account. During the authenticated account session, if the computing system receives a trade request for performing a trading action in connection with a tradeable object, the computing system grants, to the user device, time-limited access to an account operation for the resource account, where the first account operation is associated with defined first trade parameters for the requested trading action. Upon receiving user input for initiating the first account operation, the computing system validates the first account operation by verifying eligibility of the trading action and validity of the account session at the time of receipt of the user input. In response to validating the first account operation, the computing system causes the trading action to be executed based on processing the first account operation.

Reference is first made to FIG. 1 which illustrates an exemplary networked environment 100 consistent with certain disclosed embodiments. As shown in FIG. 1, the networked environment 100 may include a client device 110, a trade management system 130, a resource server 140, third-party provider systems 150, and a communications network 120 connecting one or more of the components of networked environment 100.

A resource server 140 (which may also be referred to as a server computer system) and a client device 110 communicate via the network 120. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a client entity (e.g., an individual, an organization, etc.) having resources that are managed by or using the resource server 140. For example, the resource server 140 may be a backend server of a financial institution and the client entity may be a customer of the financial institution operating the backend server. The client device 110 may store software instructions that cause the client device to establish communications with the resource server 140 and, in at least some embodiments, the trade management system 130.

The resource server 140 may track, manage, and maintain resources, make lending decisions, and/or lend resources to a client entity associated with the client device 110. The resources may, for example, be computing resources, such as memory or processor cycles. In at least some embodiments, the resources may include stored value, such as fiat currency, which may be represented in a database. For example, the resource server 140 may be coupled to a database 145, which may be provided in secure storage. The secure storage may be provided internally within the resource server 140 or externally. The secure storage may, for example, be provided remotely from the resource server 140. For example, the secure storage may include one or more data centers storing data with bank-grade security.

The database 145 may include records for a plurality of accounts and at least some of the records may define a quantity of resources associated with the client entity. For example, the client entity may be associated with an account having one or more records in the database 145. The records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated record such as, for example, a bank balance.

In at least some embodiments, the database 145 may store various types of information in connection with customers of a business entity that administers the resource server 140. For example, the database 145 may store customer profile data and financial account data associated with customers. The customer profile data may include, without limitation, personal information of registered customers, authentication credentials of the customers, account identifying information (e.g., checking account, savings account, revolving credit line, etc.), and information identifying services (e.g., banking services, investment management services, etc.) and/or programs that are offered to the customers by the business entity. The financial account data may include portfolio data relating to portfolios of investments that are held by customers. A customer's portfolio data may include, for example, information identifying actual positions held by the customer in various tradeable objects, information identifying a "virtual" portfolio composed of simulated positions held by the customer in various securities, and "watch lists" specifying various securities that are monitored by the customer.

The business entity associated with the resource server 140 may provide services that are accessible to the client entity. For example, the business entity may provide account management services, financial transaction services, and investment management services for the client entity. In at least some embodiments, the resource server 140 may be configured to provide a user interface that allows client devices 110 to access some of the services offered by the business entity. By way of example, the resource server 140 may be configured to provide a website or web-based portal which can be accessed via the client devices 110. The website (or portal) may include web content corresponding to various services offered by the business entity, and the resource server 140 may provide the web content for display on the client devices 110. As another example, the resource server 140 may be associated with a software application which may be installed and/or run on the client devices 110. In some embodiments, the resource server 140 may be an application server associated with software (e.g., mobile app, web application, software module, etc.) which may be accessed on the client device 110. The software may be, for example, a mobile banking application, an investment management application, etc. A graphical user interface (GUI) associated with the application may present display data associated with the services offered by the business entity on a display associated with the client device 110. A customer may interact with the business entity and its service offerings via the GUI of the application.

The networked environment 100 also includes a trade management system 130. The trade management system 130 represents a computing system implementing at least part of a trading platform. Various trade-related services, such as order entry and forwarding, matching of purchase and sell orders, and price determination may be performed by the trade management system 130. A user may interact with the trade management system 130 to purchase various tradeable objects (e.g., securities, commodities, etc.). In at least some embodiments, the trade management system 130 may include, or be part of, an electronic exchange. Orders for tradeable objects can be placed via the trade management system 130. In particular, the trade management system 130 may be adapted to receive order messages to purchase or sell one or more tradeable objects.

The resource server 140 is communicably coupled with the trade management system 130. In some embodiments, the resource server 140 may be in communication with a gateway that, in turn, is in communication with the trade management system 130. The resource server 140 may be configured to send instructions to the trade management system 130. In particular, the resource server 140 may generate order messages that include trade orders and transmit the order messages to the trade management system 130. A trade order may, for example, be a command to place an order to purchase or sell a tradeable object, a command to modify or cancel an order, or a combination thereof.

The resource server 140 may generate order messages at the request of an entity, such as a user of client device 110. For example, a user may manually input one or more parameters of a trade order (e.g., order price, quantity, etc.) via the client device 110, and request the resource server 140 to execute the trade order on her behalf. The parameters may be input, for example, using software (e.g., web browser, software module, etc.) operating on the client device 110. Additionally, or alternatively, the resource server 140 may generate order messages based on trade orders that are automatically generated at the resource server 140. In particular, order messages for transmitting to the trade management system 130 may be generated based on trade orders which are automatically generated by the resource server 140, in accordance with various embodiments of the methods disclosed in the present application.

In some embodiments, the trade management system 130 may be accessed using the client device 110. For example, the trade management system 130 may be configured to provide a user interface (e.g., one or more websites, digital portals, etc.) that enables direct access to services offered by the trade management system 130, such as purchase or sale of commodities. For example, the trade management system 130 may provide information associated with a web page over network 120 to client device 110 such that the client device 110 may render the received web page content on a display associated with the client device 110.

The networked environment 100 also includes one or more third-party provider systems 150. The third-party provider systems are computing systems associated with providers of services facilitating trade activities such as, but not limited to, transmission of market data (e.g., market data APIs), secure delivery of tradeable objects, online credit card processing, and shipping and addressing.

The client device 110, the trade management system 130, the resource server 140, and the third-party provider systems 150 may be in geographically disparate locations. Put differently, the client device 110 may be remote from at least one of: the trade management system 130, the resource server 140, and the third-party provider systems 150. As described above, the client device 110, the trade management system 130, the resource server 140, and the third-party provider systems 150 may be computer systems.

The network 120 is a computer network. In some embodiments, the network 120 may be an internetwork such as may be formed of one or more interconnected computer networks. For example, the network 120 may be or include an Ethernet network, an asynchronous transfer mode (ATM) network, a wireless network, or the like.

Figure 2A:
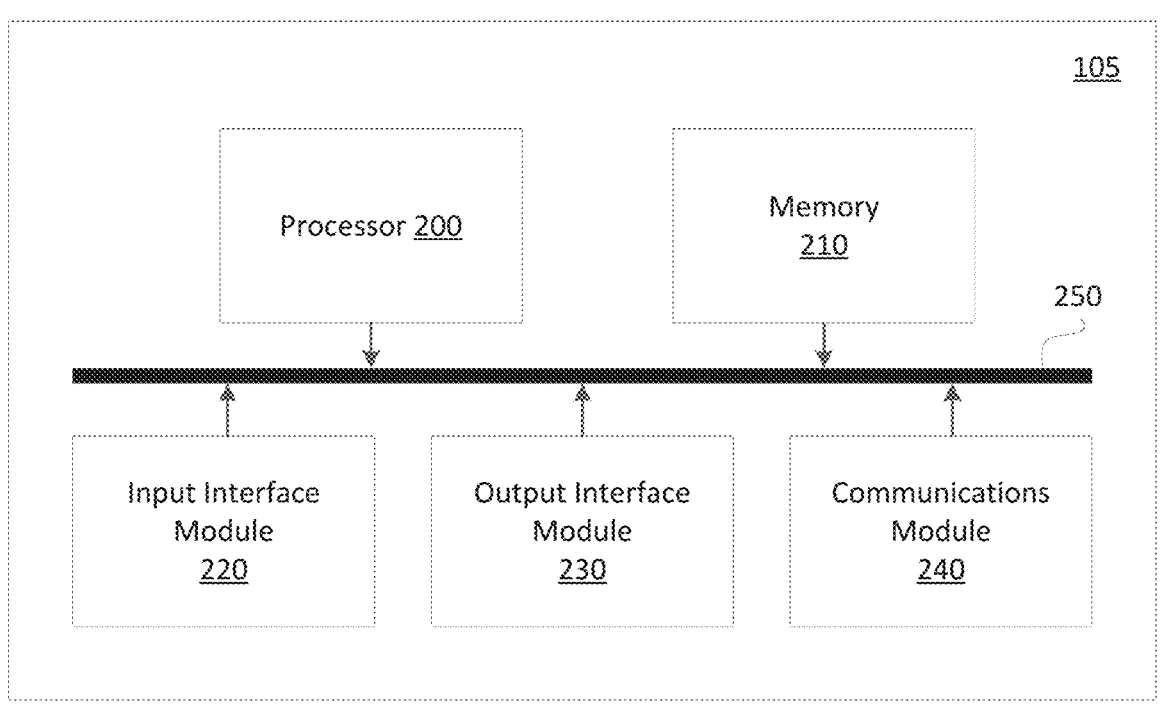
FIG. 2A is a high-level schematic diagram of an example computing device.

FIG. 2A is a high-level operation diagram of an example computing device 105. In some embodiments, the example computing device 105 may be exemplary of one or more of: the client device 110, the trade management system 130, the resource server 140, and the third-party provider systems 150. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
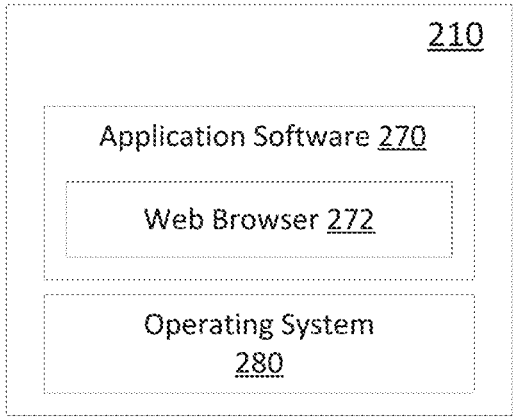
FIG. 2B is a schematic block diagram showing a simplified organization of software components stored in memory of the example computing device of FIG. 2A.

FIG. 2B depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230, and the communications module 240. The operating system 280 may be, for example, Apple iOS™, Google Android™, Linux™, Microsoft Windows™, or the like.

The application software 270 adapts the example computing device 105, in combination with the operating system 280, to operate as a device performing particular functions. The application software 270 may, for example, include a web browser 272. The application software 270 may also include processor-executable instructions which, when executed by the processor 200, cause the computing device 105 to interact with the resource server 140 as described herein.

Reference is made to FIG. 3 which shows, in flowchart form, an example method 300 for controlling access to trading actions in connection a resource account. Specifically, the method 300 may be implemented for providing users access to trading actions in authenticated account sessions for their resource account. In at least some embodiments, the method 300 may be included as part of a process for integrating trade-related services, such as those provided by a trading platform, into a resource account management system. As a specific and non-limiting example, the method 300 may be implemented to provide, to authenticated users, controlled access to various account operations associated with trading actions.

The operations of method 300 may be performed by a computing system such as, for example, the resource server 140 of FIG. 1. In some embodiments, a server comprising one or more computers may perform all of the operations of method 300. Specifically, computer-executable instructions stored in memory of a server computer may, when executed by a processor of the server, configure the processor to perform the operations of method 300.

A computing system associated with a resource server controls access to accounts that are maintained at the resource server. In particular, the computing system implements user authentication for preventing unauthorized access to user accounts. In operation 302, the computing system receives, via a first computing device, a login request for a resource account. The login request may be received through one of various interfaces associated with the resource server. For example, the login request may be transmitted to the computing system via a website, a dedicated mobile application, and the like. A user of the first computing device may initiate the login request by inputting authentication information. The login request may include, at least, authentication credentials for a specific resource account. The authentication credentials may include, for example, an account identifier (e.g., account number, etc.) and a password.

In operation 304, the computing system authenticates the user associated with the login request to an account session of the resource account. Upon receiving the login request, the computing system performs authentication of the user by verifying that user's identity using the authentication credentials. The authentication may be performed based on comparing with stored authentication information (e.g., in a user repository) for accounts of the resource server. In particular, the computing system may verify that the authentication credentials provided as part of the login request match the stored credentials associated with the identified resource account. For example, the resource account may be a bank account and the user may be authenticated to the account session based on login credentials for the bank account.

If successfully verified, the requesting user is authenticated for an account session. An account session represents a series of user actions that are performed in connection with a resource account. An account session commences at the time of login and persists for a defined time period or until logout. Upon gaining access to the account session, an authenticated user is granted permissions for performing various actions associated with the resource account. In particular, the authenticated user gains access to account operations for the resource account that are not accessible or available to non-authenticated users.

The computing system may be configured to enable trading actions in connection with resource accounts. Specifically, the computing system may allow authenticated users to perform trading actions (e.g., purchasing or selling securities, commodities, etc.) in connection with their resource accounts. For example, authenticated users may be enabled to perform "purchase" actions for buying one or more tradeable objects using resources associated with their resource accounts. In some embodiments, the computing system may provide a trading interface for facilitating trading actions by authenticated users. The trading interface may, for example, be a web or application page containing information relating to available trading actions for the authenticated user. An authenticated user may initiate a trade request using the trading interface. In particular, an authenticated user may input, via the trading interface, information for requesting a trade of a tradeable object.

In some other embodiments, the computing system may present, to authenticated users, an interface for accessing a trading platform, such as the trade management system 130 of FIG. 1. An authenticated user for a resource account may access the trading platform in order to perform various trading actions in connection with the resource account. Thus, in some embodiments, the authenticated user may effectively gain access to the resource account as well as services of a trading platform, for example, using a single sign-on (SSO) for the resource account.

The computing system receives, via the first computing device during the account session, a trade request, in operation 306. The trade request is a request for performing a first trading action in connection with a tradeable object. The trade request may indicate, for example, a type of trading action (e.g., purchase, sell), identifying information for a tradeable object, a quantity of the tradeable object associated with the requested trade, and a user-specified time for executing the trade, and the like.

In response to receiving the trade request, the computing system grants, to the first computing device, time-limited access to a first account operation for the resource account, in operation 308. Specifically, the first account operation relates to performance of the requested trade. Access to the first account operation is provided only to the authenticated user associated with the resource account, via the first computing device. In particular, a time-limited access is granted to the authenticated user. That is, the first account operation is available to be acted on by the authenticated user only for a time period of defined length. For example, the first account operation may be accessible only for a predetermined length of time that commences at the time of receiving, by the computing system, the trade request from the first computing device. In some embodiments, the time-limited access to the first account operation may be granted by providing, via the first computing device, a user interface for accessing an interface element for initiating the first account operation during a defined time period. That is, a time limit associated with access of the first account operation may be enforced by controlling display of a user interface element on an interface for initiating an account operation corresponding to the first trading action. The interface may, for example, be a trading interface provided by the computing system.

The parameters of the first account operation are determined by the computing system, based on the associated first trading action. In at least some embodiments, the first account operation may be associated with certain operation parameters that are available only to authenticated users associated with the resource accounts. The operation parameters may relate to, for example, price, quantity, time, etc. that is presented to the authenticated user in connection with a trading action. Operation parameters may be different from trade parameters associated with the first trading action. Specifically, the operation parameters relate to an account operation that is accessible to an authenticated user, while trade parameters relate to a trading action that is requested by a user, authenticated or otherwise, in connection with a tradeable object. By way of example, the first account operation may be associated with a discount (e.g., a reduction in price from an original or market price) on a "purchase" action for a tradeable object that is not available to non-authenticated users (e.g., users identified as guests or non-customers). More generally, the first account operation may be associated with parameters that are different from those parameters associated with account operations that are accessible to non-authenticated users. By limiting a window of time during which the first account operation is accessible, the computing system may ensure that certain defined operation parameters are available only to authenticated users.

Another advantage to providing time-limited access to the first account operation is that the computing system can regularly and/or frequently obtain information about the tradeable object(s) and update the first account operation based on the information. An account operation may be associated with parameters that are defined using information which may vary dynamically. For example, a "price" parameter associated with an account operation may be defined based on market data obtained from one or more electronic exchanges. In particular, the "price" parameter may depend on real-time information which may be obtained by the computing system. To ensure that the parameters associated with an account operation reflect up-to-date information, it may be desirable to obtain, periodically or otherwise, real-time information which support the selection of the parameters. An account operation, once it is made accessible to a user, is immutable and its associated parameters are fixed until changed by the computing system. A limited time window of availability of the first account operation may thus provide the computing system greater control over defining (e.g., updating) the parameters of the first account operation presented to authenticated users. In particular, the computing system may update the parameters associated with the first account operation upon expiration of each limited period of availability to reflect current, or up-to-date, information about the tradeable object for which the first trading action is requested.

The first account operation is an operation that relates to performance of the requested trade. For example, the first account operation may be an operation for purchasing a tradeable object based on transferring resources associated with the resource account. In particular, the first account operation may be a transfer operation of transferring funds from a bank account for payment towards purchase of a tradeable object (e.g., a commodity, such as precious metals). The first account operation is associated with the first trading action. The first account operation may thus be defined based on trade parameters for the first trading action. The trade parameters may include, for example, a type of the first trading action, identifying information for a tradeable object, a resource cost for the first trading action, and a user-specified time for executing the trade.

In operation 310, the computing system receives, via the first computing device, user input for initiating the first account operation at a first time. In some embodiments, the user input may include selection of a user interface element on a trading interface provided by the computing system. For example, a UI element corresponding to a "purchase" action for buying a defined quantity of a tradeable object may be presented on the trading interface. The "purchase" action may be associated with an account operation for transferring resources (e.g., funds) of the resource account towards payment for the requested trade. The user input may include selection of this UI element at the first computing device.

Upon receiving the user input, the computing system attempts to validate the first account operation. In particular, the computing system determines whether the first account operation is valid, in operation 312. The first account operation may be determined to be valid based on verifying, at least, eligibility of the first trading action and validity of the account session at the first time. The eligibility of the first trading action may be verified based on confirming that, for example, the user is legally permitted to perform the first trading action, there are sufficient resources associated with the resource account for performing the first trading action, sufficient quantities of the tradeable object are available to fulfill the requested trade, and the like.

The validity of the account session may be verified by determining whether the first account operation satisfies certain temporal requirements. In particular, the computing system may compare the first time (i.e., the time at which the first account operation is initiated by the authenticated user) with a time of availability associated with the granted access to the first account operation and a validity period associated with the account session. For example, the computing system may, in some embodiments, determine whether an access token, such as a single sign-on (SSO) token, associated with the account session is valid at the first time. In some embodiments, the computing system may generate an SSO token responsive to authenticating the user to the account session. An SSO token may be indicative of secure protocol access to the resource account. The SSO token may include information about the user's identity, the user's access privileges, and conditions of validity (e.g., valid time period). The first trading action may be processed, for example, by a trading platform, only if a valid SSO token is received in conjunction with input associated with the first account operation. The account session may be determined as being valid if an access token associated with the account session is valid (e.g., has not expired) at the first time.

In response to validating the first account operation, the computing system causes the first trading action to be executed based on processing the first account operation, in operation 314. Once the first account operation is determined to be valid, the computing system may generate a trade order based on parameters of the first account operation and/or the first trading action. The trader order may, for example, be an order to purchase or sell a defined quantity of a tradeable object. The computing system may transmit the trade order to a trade processing system, such as a trading platform. Alternatively, the computing system may itself process the trade order by allocating the tradeable objects to the requesting user/resource account.

Reference is made to FIG. 4 which shows, in flowchart form, an example method 400 for authenticating a user to an account session of a resource account. The method 400 may be implemented as part of a process for providing authenticated users access to account operations associated with a resource account that relate to one or more trading actions. In particular, the method 400 authenticates a user to generate an SSO token.

In operation 402, a user navigates to a trading interface (e.g., a precious metals store website) using their client device. For example, the user may select a link in a financial institution's website, using a browser application on their client device, or activate a UI element in a dedicated mobile app associated with the financial institution, such as a mobile banking app, for accessing a trading interface.

In operation 404, the financial institution's website or mobile app may redirect the user to a customer single sign-on provider (CSSP), passing parameters identifying the destination as the trading interface. The CSSP may, in some embodiments, be hosted by the resource server, or a separate entity.

In operation 406, the CSSP checks the received information for validity. For example, the input information may be account session information, such as a session identifier (included in the browser's session cookies, for example). The CSSP is configured to load the SSO configuration used for enabling a transition from accessing a main platform for the financial institution to a trading interface. The CSSP then obtains a user access token, such as from server-side cache, and may call an enterprise federation server that enables user authentication and single sign-on to exchange it for an SAML assertion.

In operation 408, the CSSP sends a response to the user's browser—a FORM with a redirect URL which includes a valet key in the form of input parameters. The browser may POST to a specific trading interface URI, in operation 410, which then handles the SSO intake process. In operation 412, during SSO, an enterprise foundation server exchanges the SAML assertion for an OAuth access token, which can subsequently be used to provide and facilitate user access.

Reference is made to FIG. 5 which shows, in flowchart form, an example method 500 for processing requests to perform trading actions in connection with a tradeable object. In at least some embodiments, the method 500 may be implemented as part of a process for providing a user interface of a trading platform on client devices. As a specific and non-limiting example, the method 500 may be implemented to provide, to authenticated users, controlled access to various account operations associated with trading actions.

The operations of method 500 may be performed by a computing system such as, for example, the resource server 140 of FIG. 1. In some embodiments, a server comprising one or more computers may perform all of the operations of method 500. Specifically, computer-executable instructions stored in memory of a server computer may, when executed by a processor of the server, configure the processor to perform the operations of method 500. The operations of method 500 may be performed in addition to, or as alternatives of, one or more of the operations of methods 300 and 400.

In operation 502, the computing system receives, via a client device, a trade request for performing a first trading action in connection with a tradeable object. The trade request may, for example, be a request to perform a trading action (e.g., purchase, sell) in connection with a commodity, such as precious metals. In at least some embodiments, the trade request may be received through user input on a website or a dedicated mobile app associated with a resource account management system. For example, a user may request the trade via a website or application associated with a financial institution, such as a bank.

The computing system determines whether the requesting user is logged in to an account session associated with a resource account, in operation 504. In particular, the computing system determines an identity of a user associated with the trade request and performs a check to determine whether the user has been authenticated for an account session. For example, the computing system may verify if the requesting user is associated with a valid authenticated account session for a resource account.

If the user is determined as being logged in, the computing system grants time-limited access to a first account operation associated with first trade parameters, in operation 506. The first trade parameters are defined parameters that are associated with the first trading action. The first account operation is an operation for the resource account that relates to performance of the requested trade. For example, the first account operation may be a "purchase" action for causing a transfer of resources (e.g., funds) towards payment for purchase of one or more tradeable objects.

The computing system receives user input for initiating the first account operation, in operation 508. The user input is received via a user interface on the client device such as, for example, a website or application associated with a resource account management system. In operation 510, the computing system validates the first account operation. In particular, the computing system may verify the eligibility of the first trading action and the validity of the account session at the time of receiving the user input as part of the validating operation. The validation of the first account operation may be performed, for example, as described above with reference to method 300. In response to validating the first account operation, the computing system causes the first trading action to be executed based on processing the first account operation, in operation 512.

If, on the other hand, the requesting user is not logged in to an authenticated account session, the computing system grants access to a second account operation associated with second trade parameters that are different from the first trade parameters, in operation 514. The second account operation is different from the time-limited first account operation that is made available to authenticated users. The second account operation is an operation which may be available for one or more non-authenticated users. In particular, the second account operation may not be associated with operation parameters that are represented in the first account operation.

In operation 516, the computing system receives input for initiating the second account operation. The input may be provided by a non-authenticated user that does not have access to the time-limited first account operation. For example, a user that does not have a resource account at the resource server or decides not to log in to an existing resource account may input, via the trading interface, selection of an option or interface element for initiating the second account operation. The computing system then causes the first trading action to be executed based on processing the second account operation, in operation 518. In this way, the computing system may process trade requests by providing users access to different account operations, associated with different sets of operation parameters, for causing execution of the same trade/trading action. Specifically, users may access different account operations based on whether they are authenticated or not authenticated to an account session associated with a resource account.

Figure 6:
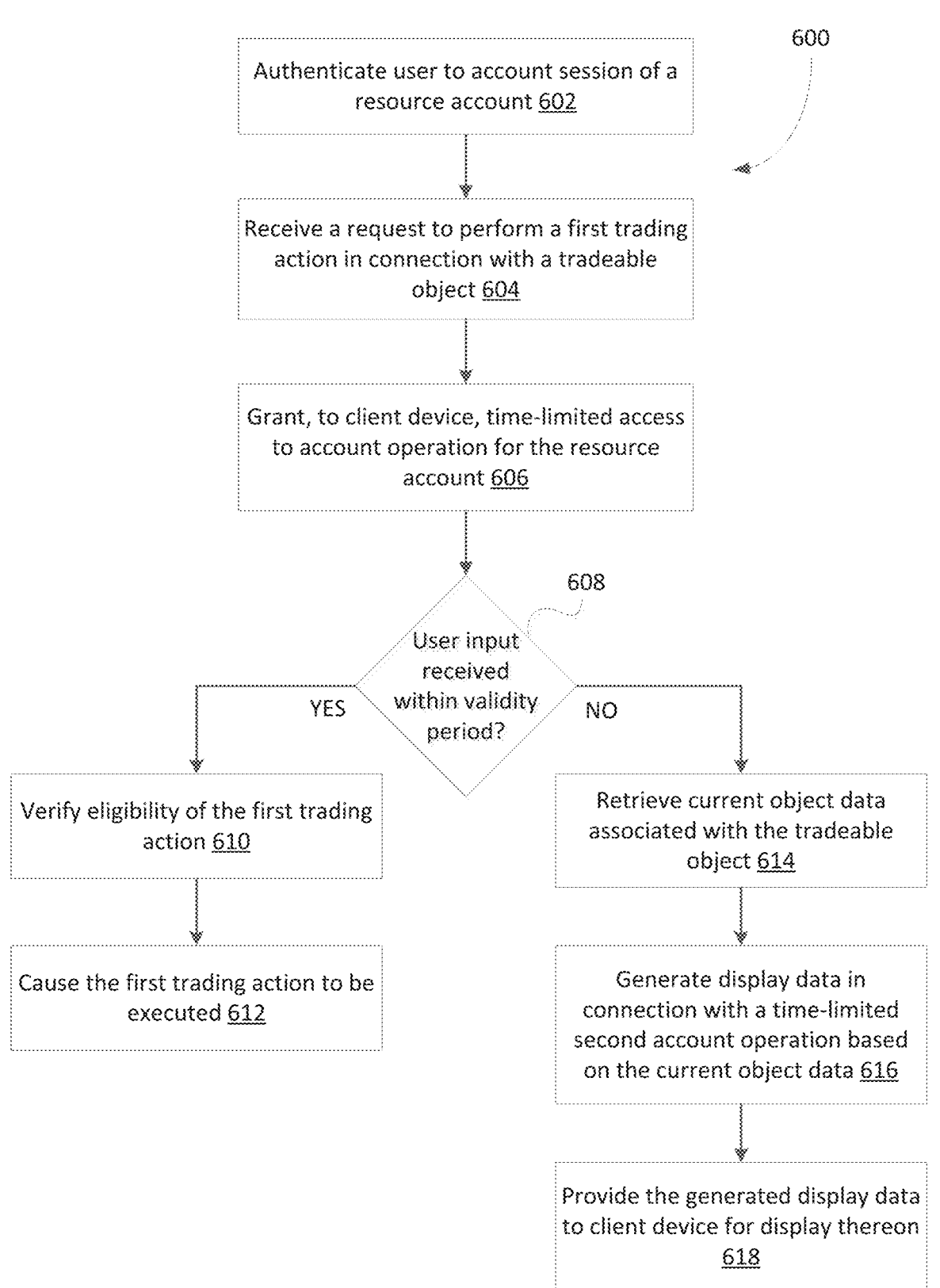
FIG. 6 shows, in flowchart form, another example method for processing requests to perform trading actions in connection with a tradeable object.

Reference is made to FIG. 6 which shows, in flowchart form, another example method 600 for processing requests to perform trading actions in connection with a tradeable object. In at least some embodiments, the method 600 may be implemented as part of a process for providing a user interface of a trading platform on client devices. As a specific and non-limiting example, the method 600 may be implemented to provide, to authenticated users, controlled access to various account operations associated with trading actions.

The operations of method 600 may be performed by a computing system such as, for example, the resource server 140 of FIG. 1. In some embodiments, a server comprising one or more computers may perform all of the operations of method 600. Specifically, computer-executable instructions stored in memory of a server computer may, when executed by a processor of the server, configure the processor to perform the operations of method 600. The operations of method 600 may be performed in addition to, or as alternatives of, one or more of the operations of methods 300, 400 and 500.

In operation 602, the computing system authenticates a user to an account session of a resource account. The user may request login to the resource account by providing their authentication credentials, and the computing system may grant the user access to an account session based on verifying the authentication credentials.

The computing system then receives a request to perform a first trading action in connection with a tradeable object, in operation 604. The request may be received from a client device associated with the authenticated user during the account session. For example, the request may be a purchase request to buy a defined quantity of a tradeable object. The user may input the request through a user interface, such as a website or application, associated with a resource account management system.

In operation 606, the computing system grants, to the client device, time-limited access to a first account operation for the resource account. The first account operation is an operation associated with the resource account that relates to performance of the requested trade. For example, the computing system may avail, for a limited time period, an account operation corresponding to a "purchase" action for causing a transfer of resources associated with the resource account towards payment for purchase of a tradeable object.

The computing system determines whether user input for initiating the first account operation is received within a validity period, in operation 608. The validity period represents a defined length of time during which the first account operation is valid/available to the authenticated user. The validity period may be based on a defined time window associated with the first account operation and an amount of time for which the authenticated account session is valid. In particular, the computing system may monitor input of the authenticated user and determine whether a user input for initiating the time-limited first account operation is provided by the authenticated user. If such user input is received within the validity period, the computing system proceeds to process the first account operation. In particular, the computing system may verify eligibility of the first trading action (operation 610) and cause the first trading action to be executed (operation 612) based on processing the first account operation.

If, on the other hand, the user input is not received within a validity period, the computing system may be configured to cancel the time-limited access to the first account operation. Instead, the computing system provides, to the authenticated user, access to a different second account operation in connection with the same trade request. This second account operation may, for example, be a variation on the first account operation. For example, a trading interface provided by the computing system may be "refreshed" by providing information associated with a second account operation, in place of the first account operation, for performance of the requested trade at or subsequent to the expiry of the validity period. The second account operation may represent a change in at least one operation parameter (e.g., price) with respect to the first account operation.

In operation 614, the computing system retrieves current object data associated with the tradeable object. For example, the computing system may obtain real-time market data for the tradeable object that is the subject of the requested trade. The operation parameters for the second account operation may be defined based on the retrieved current object data. In particular, the determination of one or more of the operation parameters for the second account operation may depend on the object data retrieved by the computing system.

The computing system then generates display data in connection with a time-limited second account operation based on the current object data, in operation 616. The display data may include, for example, an indication of an updated price that represents a current, or most up-to-date, price associated with the tradeable object. The generated display data is provided to the client device for display thereon, in operation 618. For example, the generated display data may be provided as replacement of display data associated with the first account operation for initiating the requested trade.

Figure 7:
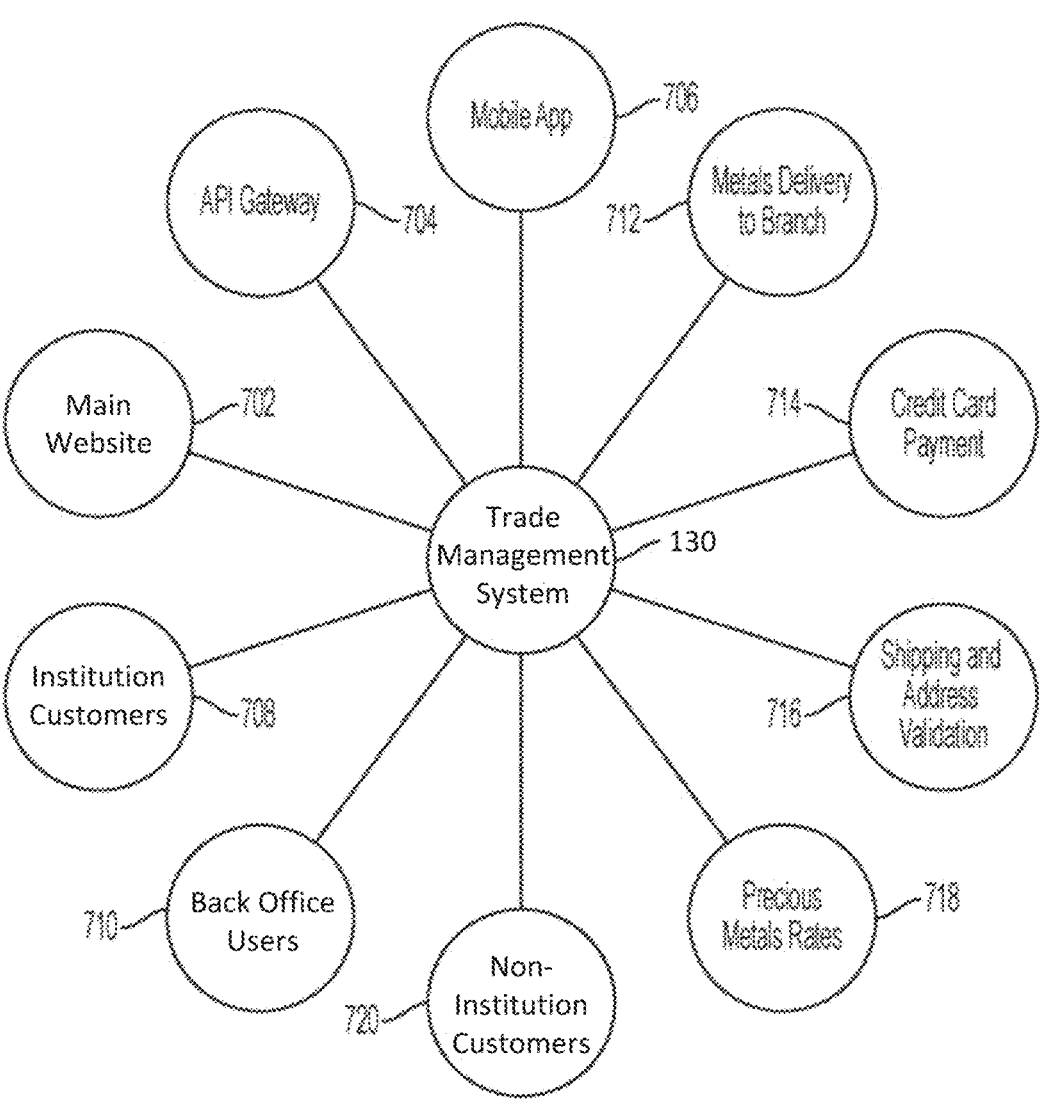
FIG. 7 is a context diagram for an example trade processing system.

FIG. 7 is a context diagram for an example trade processing system. In at least some embodiments, an online precious metals store may be provided as part of or in connection with a trade processing system. For example, the trade processing system may include a trade management system 130 that provides Java-based tools for creation and management of sophisticated Internet websites. A financial institution, such as a bank, may provide access to a proprietary website for a user through one or more of: the main institution website 702 for the financial institution, an API gateway 704 that provides a dedicated application to communicate with the trade management system 130, a mobile app 706 that interacts with the trade management system 130, and alternatively through other protocols for financial institution customers 708 and internal financial institution back-office users 710. An example aspect that all or some of these types of entities may share is that they have a preexisting trust relationship with the financial institution itself that provides the financial institution the capability to verify and/or authenticate the user, and then provide for access to improve secure access to the trade management system 130 and provide the trade management system 130 with additional flexibility.

The trade management system 130 interacts with third party information sources and parties. For example, a transaction store provides for actual delivery of the precious metals to branches by using a delivery service 712, such as the GARDAWORLD corporation, which is a private security firm that offers secure delivery of the precious metals to the branch offices where purchasers can receive them. The trade management system 130 also coordinates credit card payments for the precious metals by using a credit card payment service 714, such as BAMBORA, which is a Swedish provider of credit card transaction processing services. The trade management system 130 may also interact with a shipping and address validation service 716, such as CANADA POST to coordinate shipping tasks, as well as using information supplied by CANADA POST to perform address validation. The trade management system 130 also interacts with a precious metals rates service 718, such as THOMPSON REUTERS to access precious metals rates information. Finally, the trade management system 130 is able to provide limited transaction access for non-financial institution customers 720, but because the financial institution does not have information for these customers, but it may still be appropriate to provide non-financial institution customers 720 the capability to perform some transactions. However, it is to be noted that because non-financial institution customers 720 may not be authenticated in the same manner as financial institution customers 708, there may be limitations on what non-financial institution customers 720 are allowed to do. For example, non-financial institution customers 720 may be restricted to credit card payments, there may be caps on how much the non-financial institution customers 720 are allowed to spend, which products the non-financial institution customers 720 are allowed to purchase, where the products may be delivered, and so on, as non-limiting examples, and there may be other limitations placed on non-financial institution customers 720, in other examples, and these enumerated limitations are not enforced in all examples.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor; and
a memory coupled to the processor, the memory storing instructions that, when executed by the processor, configure the processor to:
receive, via a first computing device, a login request for a resource account;
authenticate a user associated with the login request to an account session of the resource account;
receive, via the first computing device during the account session, a trade request for performing a first trading action in connection with a tradeable object;
in response to receiving the trade request:
grant, to the first computing device, time-limited access to a first account operation for the resource account, the first account operation associated with defined first trade parameters for the first trading action that are different from corresponding parameters of trading actions that are accessible to non-authenticated users;
in response to receiving, via the first computing device, user input for initiating the first account operation at a first time:
validate the first account operation based on verifying eligibility of the first trading action and validity of the account session at the first time; and in response to validating the first account operation, cause the first trading action to be executed based on processing the first account operation, and
in response to determining that the user input is not received within a defined period of validity of the first account operation:
retrieve, from a remote computing server, current object data associated with the tradeable object;
generate display data comprising graphical representation of updated trade parameter values associated with a time-limited second account operation based on the current object data, the updated trade parameter values representing a real-time update of values of the first trade parameters associated with the first account operation; and
present, on the first computing device, a refreshed user interface for accessing account operations associated with the trading actions based on providing the generated display data associated with the second account operation as replacement for display data associated with the first account operation.

2. The computing system of claim 1, wherein the instructions, when executed, further configure the processor to:
receive, via a second computing device, a second trade request for performing a second trading action in connection with the tradeable object;
determine that the second trade request does not originate from a computing device associated with the account session;
in response to the determining, grant, to the second computing device, access to a second operation associated with second trade parameters that are different from the first trade parameters.

3. The computing system of claim 1, wherein the first trade parameters include a resource cost associated with obtaining the tradeable object and wherein the first account operation comprises a transfer of resources associated with the resource account.

4. The computing system of claim 1, wherein verifying the validity of the account session comprises verifying that an access token associated with the account session is valid at the first time.

5. The computing system of claim 1, wherein granting the time-limited access to the first account operation for the resource account comprises providing, via the first computing device, a user interface for accessing an interface element for initiating the first account operation during a defined first time period.

6. The computing system of claim 5, wherein the first time period is dependent on an object type associated with the tradeable object.

7. The computing system of claim 1, wherein the instructions, when executed, further configure the processor to provide a user interface for inputting the trade request, wherein the providing the user interface includes providing an indication that the first account operation is associated with the account session.

8. The computing system of claim 1, wherein the resource account comprises a bank account and wherein the user is authenticated to the account session based on login credentials associated with the bank account.

9. The computing system of claim 1, wherein the instructions, when executed, further configure the processor to:

19
20 generate a single sign-on (SSO) token responsive to authenticating the user to the account session; and transmit the SSO token to the first computing device, wherein the first account operation is processed using the SSO token.

10. A computer-implemented method, comprising:

receiving, via a first computing device, a login request for a resource account;

authenticating a user associated with the login request to an account session of the resource account;

receiving, via the first computing device during the account session, a trade request for performing a first trading action in connection with a tradeable object;

in response to receiving the trade request:

granting, to the first computing device, time-limited access to a first account operation for the resource account, the first account operation associated with defined first trade parameters for the first trading action that are different from corresponding parameters of trading actions that are accessible to non-authenticated users;

in response to receiving, via the first computing device, user input for initiating the first account operation at a first time:

validating the first account operation based on verifying eligibility of the first trading action and validity of the account session at the first time; and in response to validating the first account operation, cause the first trading action to be executed based on processing the first account operation, and in response to determining that the user input is not received within a defined period of validity of the first account operation:

retrieving, from a remote computing server, current object data associated with the tradeable object;

generating display data comprising graphical representation of updated trade parameter values associated with a time-limited second account operation based on the current object data, the updated trade parameter values representing a real-time update of values of the first trade parameters associated with the first account operation; and presenting, on the first computing device, a refreshed user interface for accessing account operations associated with the trading actions based on providing the generated display data associated with the second account operation as replacement for display data associated with the first account operation.

11. The method of claim 10, further comprising:

receiving, via a second computing device, a second trade request for performing a second trading action in connection with the tradeable object;

determining that the second trade request does not originate from a computing device associated with the account session;

in response to the determining, granting, to the second computing device, access to a second operation associated with second trade parameters that are different from the first trade parameters.

12. The method of claim 10, wherein the first trade parameters include a resource cost associated with obtaining the tradeable object and wherein the first account operation comprises a transfer of resources associated with the resource account.

13. The method of claim 10, wherein verifying the validity of the account session comprises verifying that an access token associated with the account session is valid at the first time.

14. The method of claim 10, wherein granting the time-limited access to the first account operation for the resource account comprises providing, via the first computing device, a user interface for accessing an interface element for initiating the first account operation during a defined first time period.

15. The method of claim 14, wherein the first time period is dependent on an object type associated with the tradeable object.

16. The method of claim 10, further comprising providing a user interface for inputting the trade request, wherein the providing the user interface includes providing an indication that the first account operation is associated with the account session.

17. The method of claim 10, wherein the resource account comprises a bank account and wherein the user is authenticated to the account session based on login credentials associated with the bank account.

18. The method of claim 10, further comprising:

generating a single sign-on (SSO) token responsive to authenticating the user to the account session; and transmitting the SSO token to the first computing device, wherein the first account operation is processed using the SSO token.

* * * * *